H. GOTTSCHALK.
PAN CLEANING AND GREASING MACHINE.
APPLICATION FILED JULY 17, 1918.
1,282,570.
Patented Oct. 22, 1918.
2 SHEETS—SHEET 1.
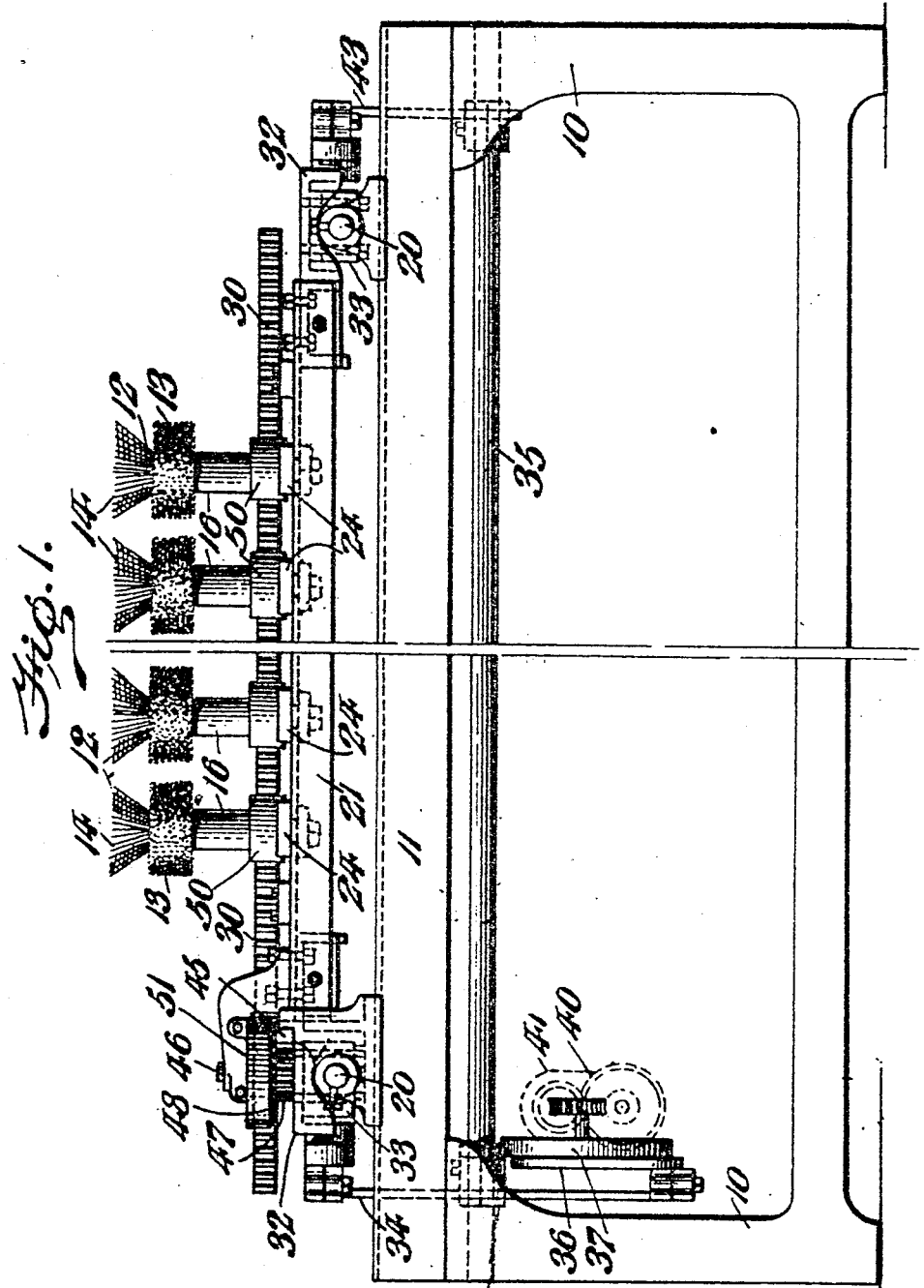
Inventor
Hugo Gottschalk
By Robert M. Ban.
Attorney

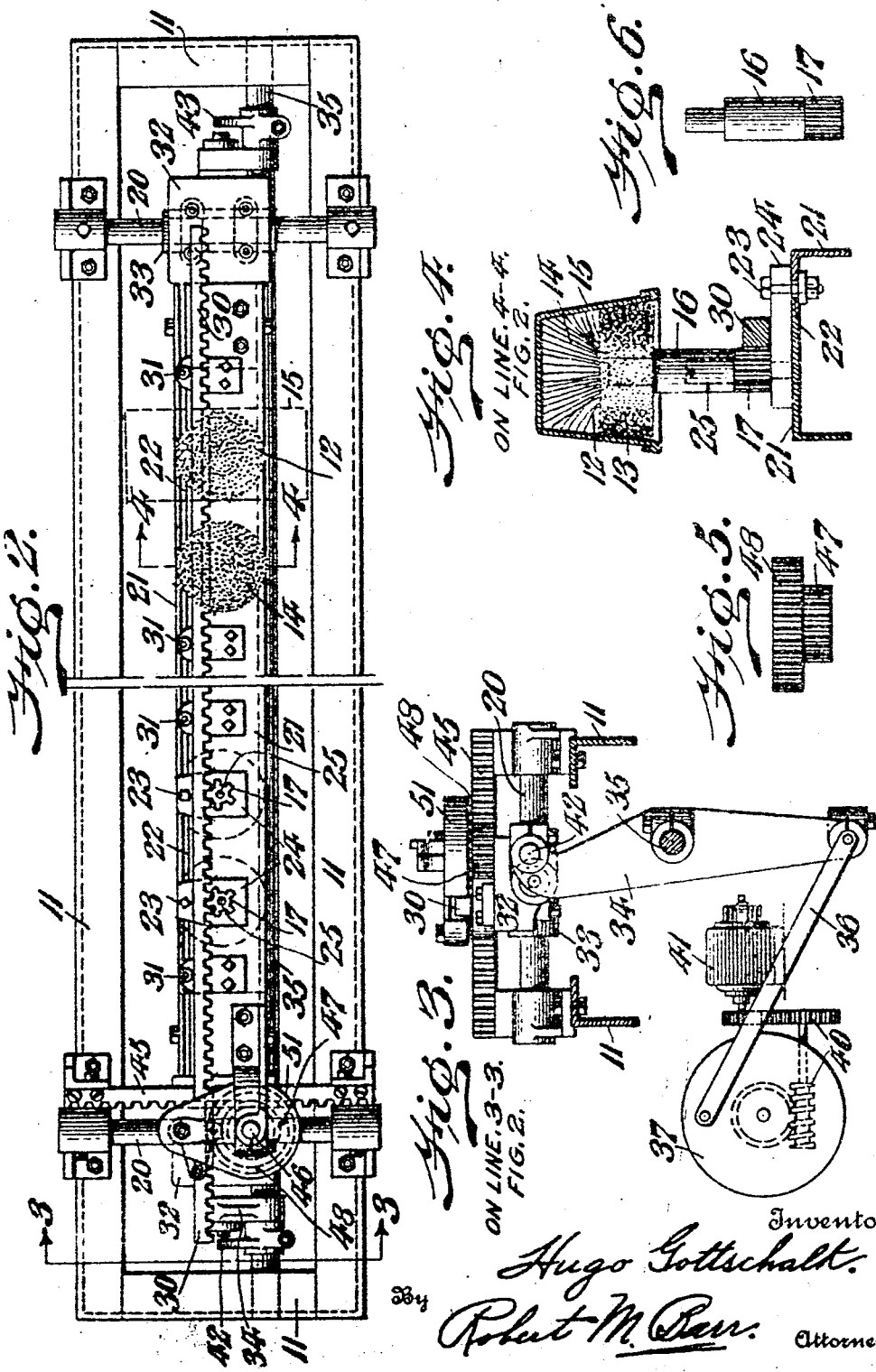

UNITED STATES PATENT OFFICE.

HUGO GOTTSCHALK, OF REEDSVILLE, PENNSYLVANIA.

PAN CLEANING AND GREASING MACHINE.

1,282,570.      Specification of Letters Patent.      Patented Oct. 22, 1918.

Application filed July 17, 1918. Serial No. 245,275.

*To all whom it may concern:*

Be it known that I, HUGO GOTTSCHALK, a citizen of the United States, and a resident of Reedsville, in the county of Mifflin and State of Pennsylvania, have invented a certain new and useful Pan Cleaning and Greasing Machine, of which the following is a specification.

Some of the objects of the present invention are to provide means for cleaning pans for baking purposes; to provide means for greasing pans for baking purposes; to provide means for successively cleaning and greasing pans; to provide means for reciprocating rotary cleaning and greasing devices within a pan; to provide means for causing a brush or brushes to travel parallel to the longitudinal axis of a stationary pan and to simultaneously rotate the brush or brushes; to provide means for causing a brush or brushes to simulate the action of manually cleaning and greasing a pan or pans, and to provide other improvements as will hereinafter appear.

In the accompanying drawings, Figure 1 represents a side elevation of a pan cleaning and greasing machine embodying one form of the present invention; Fig. 2 represents a plan of the same; Fig. 3 represents a section on line 3—3 Fig. 2; Fig. 4 represents a section on line 4—4 Fig. 2; Fig. 5 represents a detail of the transmission gears; and Fig. 6 represents a detail of the brush supports.

Referring to the drawings one form of the present invention is shown mounted upon a base 10 preferably of angle iron construction forming an open top frame 11 which is located at a suitable distance above the floor to permit the cleaning and greasing brushes to be readily and easily reached by an operator.

For cleaning and greasing the pans preparatory to placing the dough therein a plurality of brushes 12 are provided each having a suitable number of rows of substantially horizontal bristles 13 and a number of diverging substantially axially arranged bristles 14, the former serving to contact with the sides and end of a pan 15 and the latter to contact with the bottom and corners thereof. The bristle portions of the respective brushes 12 are fixedly secured to a sleeve 16 which is rigid with a gear 17, the construction being such that the several brushes are interchangeable and removable.

For supporting the brushes 12 in operative position the frame 11 has fixed thereto in suitable spaced relation a pair of rigid rods 20 which extend transversely of the frame and are parallel to each other. The rods 20 form end supports and guides for a carriage 21 which is arranged parallel to the longitudinal axis of the base and is provided adjacent one edge with a slot 22, the purpose of which is to receive the fastening bolts 23, of the plates 24 which carry respectively rigid vertically disposed spindles 25 designed to fit snugly within the respective sleeves to form bearings upon which the brush sleeves may turn freely. By providing the slot 22 any number of brushes 12, within limits, may be mounted upon the carriage 21 and while the respective plates 24 are rigidly fastened in place to locate the brushes 12 a predetermined distance apart, the said brushes 12 are separately removable and may be lifted from the spindles 25 at will and also adjusted as to their distance apart. In the preferred form there are ten brushes 12, five being employed for cleaning and five for greasing so that a pan unit usually consisting of five pans secured together, can be first cleaned and then greased by holding over first one set of brushes and then over the other.

In order to give the brushes 12 the desired rotary movement periodically in opposite directions, a rack 30 is arranged parallel to the longitudinal axis of the frame 11 and has sliding movement above the plates 24 and transversely thereof in mesh with the gears 17 of the respective brushes 12. At suitable intervals along the frame 11 a number of guide rollers 31 are mounted for contact with the back of the rack 30, thus holding the rack 30 in mesh with the brush gears 17 and also guiding it and reducing friction.

For the purpose of moving the brushes 12 relative to and parallel to the longitudinal axes of the pans 15, the carriage 21 is fixed adjacent its ends to the heads 32, which have tubular portions 33 fitted upon the respective rods 20 for sliding movement. These heads 32 are reciprocated upon the rods 20 by a crank motion consisting of a lever 34 fast upon a rock shaft 35, which extends longitudinally of the base 10 and is journaled therein, said lever 34 being connected to a rotary disk 37, here shown as driven by a suitable gear transmission 40 from a motor 41. The lever 31 is pivoted at its free end to the adjacent carriage head 32 by means of a pin 42. The opposite carriage head 32 receives the same motion from an arm 43, fast to and operated by the rock shaft 35 and consequently both ends of the carriage are driven direct and the carriage moves uniformly without binding.

In order to reciprocate the rack 30 a mechanical movement is employed consisting of a stationary rack 45 disposed transversely of the frame 11 at right angles to the path of movement of the rack 30 and made fast to the frame 11 in close proximity to one of the rods 20. The slidable head 32 upon this rod 20 has fixed thereto a pin 46 which forms the fixed axis for a pair of gears 47 and 48 arranged in superposed relation and suitably fastened together so that rotation of one gear causes similar rotation of the other. The gear 47 is located in the same horizontal plane as the rack 45 and is in mesh with the rack 45, while the gear 48 is in the same horizontal plane as the rack 30 and in mesh with said rack 30 so that as the carriage 32 moves along the rod 20 the stationary rack 45 causes the gear 47 to rotate and thus turn the gear 48 which thereupon drives the rack 30 in one direction or the other according to the direction of travel of the carriage 21. The result of this action is to cause a continuous rotation of the brushes periodically in opposite directions within the pans and also a body reciprocation of the brushes from one end of the pan to the other, so that if the pans are being cleaned the movement of the brushes is such as to scour the side walls thoroughly while the end bristles do the same to the bottom and corners of the pans. In greasing the pans, the brushes are subjected to the same periodic rotary movement combined with the reciprocation, and the result is that the pans are subjected to substantially the same action, as when greasing them by hand, that is the machine simulates precisely the manual operation.

To protect the operator from moving parts, such as the gears, or racks any suitable form of gear covers may be used, such for example, as that shown in Fig. 1 as indicated at 50, and covers of this type may be arranged side by side to overlap one another and entirely conceal the gears and the racks. A similar type of cover plate 51 is shown as a guard over the gear 48.

In the operation of the machine it will be evident from Figs. 1 and 2 that the brushes are preferably located in alinement, parallel to the longitudinal axes of the machine and a certain number of them serve as cleaning brushes, while the remaining ones are employed for greasing the pans. With the machine running the lever 31 is given a rocking motion by the motor-driven crank arm 30, thereby rocking the shaft 35 and causing the carriage 21 to move back and forth transversely over the frame 11. This movement of the carriage transmits motion by means of the rack 45 and gear 47 to the gear 48 which is thereupon rotated periodically in opposite directions and being in mesh with the rack 30 causes the latter to have a continuous reciprocating movement which through the small gears 17 rotates the brushes in the required manner. It will be understood that the operator stands at one side of the machine and places the pans inverted over the brushes, so that each pan receives a brush and the carriage and rack move back and forth at right angles to each other thus giving a combined rotary and reciprocating movement to the brushes to perform the required function. In case the unit having the pans, as part of its structure, embodies pans of different width for different sized bread loaves or other material, the operator may readily move the required brushes to space them differently so that each is correctly positioned with respect to a pan.

In the foregoing, one form of the present invention has been described which has been found to give satisfactory and reliable results; but it is to be understood that the showing here is only by way of example and that the construction is susceptible of modification in various particulars, without departing from the spirit or scope of the invention or sacrificing any of its advantages.

What I claim is:—

1. In a pan cleaning and greasing machine, a brush arranged to project into a pan, and means to simultaneously reciprocate said brush bodily and to periodically rotate said brush in opposite directions.

2. In a pan cleaning and greasing machine, a plurality of brushes arranged to project into a plurality of pans respectively, and means to simultaneously reciprocate said brushes bodily and to periodically rotate said brushes in opposite directions.

3. In a pan cleaning and greasing machine, a carriage, a plurality of brushes mounted thereon and arranged respectively to project into a plurality of pans, means to reciprocate said carriage and means to impart rotary reciprocal movement periodically in opposite directions to said brushes.

4. In a pan cleaning and greasing machine, a carriage, a plurality of brushes mounted thereon arranged respectively to project into a plurality of pans, means to reciprocate said carriage and means to simultaneously rotate said brushes periodically in opposite directions.

5. In a pan cleaning and greasing machine, a carriage, a plurality of brushes mounted thereon arranged respectively to project into a plurality of pans, and means including a plurality of racks for simultaneously reciprocating said carriage and rotating said brushes.

6. In a pan cleaning and greasing machine, a carriage, a plurality of brushes mounted thereon arranged respectively to project into a plurality of pans, and means including a plurality of racks for simultaneously reciprocating said carriage and rotating said brushes in both directions.

7. In a pan cleaning and greasing machine, a carriage, a plurality of brushes mounted thereon arranged respectively to project into a plurality of pans, and means including a fixed rack and a movable rack for reciprocating said carriage and rotating said brushes.

8. In a pan cleaning and greasing machine, the combination of a brush arranged to project into a pan, and means including a pair of racks for imparting a rotary reciprocal movement to said brush and for simultaneously reciprocating said brush bodily.

9. In a pan cleaning and greasing machine, the combination of a plurality of brushes arranged to project respectively into a plurality of pans, and means including a pair of racks for imparting a rotary reciprocal movement to said brushes and for simultaneously reciprocating said brushes bodily.

In testimony whereof, I have hereunto signed my name.

HUGO GOTTSCHALK.